United States Patent [19]
Mathews et al.

[11] 3,944,699
[45] Mar. 16, 1976

[54] OPAQUE MOLECULARLY ORIENTED AND HEAT SET LINEAR POLYESTER FILM AND PROCESS FOR MAKING SAME

[75] Inventors: Carl Fraser Mathews; Christopher Deverell, both of Hitchin; Gordon Edmund Alfred Pears, Harpenden; Peter George Knowles, Luton, all of England

[73] Assignee: Imperial Chemical Industries Limited, London, England

[22] Filed: Oct. 19, 1973

[21] Appl. No.: 407,951

[30] Foreign Application Priority Data
Oct. 24, 1972 United Kingdom............... 48931/72

[52] U.S. Cl................ 428/220; 96/87 R; 260/37 R; 260/873; 264/45.4; 282/28 R; 264/210 R; 428/483
[51] Int. Cl.²................... C08G 39/10; B32B 27/08

[58] Field of Search....... 260/873, 75 T; 264/210 R; 96/87; 428/220, 483

[56] References Cited
UNITED STATES PATENTS

| 3,322,854 | 5/1967 | Yasui et al............ | 260/873 |
|---|---|---|---|
| 3,405,198 | 10/1968 | Rein et al............. | 260/873 |
| 3,579,609 | 5/1971 | Sevenich.............. | 260/873 |
| 3,755,499 | 8/1973 | Heijo................... | 260/873 |

*Primary Examiner*—Harold D. Anderson
*Assistant Examiner*—T. Pertilla
*Attorney, Agent, or Firm*—Cushman, Darby & Cushman

[57] ABSTRACT

Opaque voided films having a total luminous transmission not exceeding 25% are made from blends of a polyester preferably polyethylene terephthalate, with 3 to 27% of an ethylene or propylene polymer, prepared by dry blending. One end use of the film, as a base for photographic prints is also described.

12 Claims, No Drawings

OPAQUE MOLECULARLY ORIENTED AND HEAT SET LINEAR POLYESTER FILM AND PROCESS FOR MAKING SAME

This invention relates to the production of opaque molecularly oriented films of linear polyesters.

U.S. Pat. No. 3,579,609 relates to polyethylene terephthalate films containing an olefine polymer or copolymer or polytetramethylene oxide additive to enhance the flex-resistant properties of the film. Such flex-resistant films are said to contain no voiding.

U.S. Pat. No. 3,640,944 relates to polyethylene terephthalate tapes containing from 1 to 30% by weight of a high temperature polymeric additive, such as polysulphone, polyphenyleneoxide or poly-4-methyl-1-pentene and up to 3% of a light absorbing material. Such films are said to be voided and opaque. The polymeric additive and the light absorbing material are blended into the polyethylene terephthalate by introducing them into the reaction vessel in which the polyethylene terephthalate is polymerised or by introducing the polyethylene terephthalate and the additives into the film extruder alone or together.

British Pat. No. 1,195,153 relates to the production of oriented films of polyethylene terephthalate containing from 0.01 to 5% by weight of polyamide or polypropylene having a melting point not higher than that of polyethylene terephthalate by manufacturing conditions which are the same as those used for ordinary polyethylene terephthalate films. The polyamide or polypropylene may be incorporated at the polycondensation stage in the production of the polyethylene terephthalate or in the supply hopper of the extruder. The presence of the polyamide or polypropylene is said to improve the homogeneity of the films which are also relatively transparent.

British Pat. No. 1,096,064 relates to thermoplastic films containing additives which may be polymers other than those from which the film is made, which other polymers either melt at a temperature higher than the highest temperature used during the fabrication of the film or are virtually immiscible with the molten film forming material when the other polymer itself is in the molten state. Polyamides incorporated into polyethylene terephthalate films are disclosed.

The present invention relates to a selection of polymeric additives in polyethylene terephthalate and forming conditions by which an opaque and voided film may be produced.

According to the present invention a process for the production of an opaque molecularly oriented and heat set linear polyester film comprises forming a blend of particles of a linear polyester with from 3 to 27% by weight of particles of a homopolymer or copolymer of ethylene or propylene, extruding the blend as a film, quenching and biaxially orienting the film by stretching it in mutually perpendicular directions, and heat setting the film.

The opacity of the resulting film arises through voiding which occurs between the regions of the linear polyester and the propylene polymer during the stretching operation.

The linear polyester component of the film may consist of any thermoplastic film forming polyester which may be produced by condensing one or more dicarboxylic acids or a lower alkyl diester thereof, e.g. terephthalic acid, isophthalic, phthalic, 2,5-, 2,6- or 2,7-naphthalene dicarboxylic acid, succinic acid, sebacic acid, adipic acid, azelaic acid, bibenzoic acid, and hexahydroterephthalic acid, or bis-p-carboxy phenoxy ethane, with one or more glycols, e.g. ethylene glycol, 1,3-propanediol, 1-4-butanediol, neopentyl glycol and 1,4-cyclohexanedimethanol. It is to be understood that a copolyester of any of the above materials may be used. The preferred polyester is polyethylene terephthalate.

The polymeric additive which is blended with the polyester is a homopolymer or copolymer of ethylene or propylene. A mixture of homopolymers and/or copolymers of ethylene and propylene may be employed if desired. Generally a homopolymer produces adequate opacity in the film and it is preferred to use homopolypropylene. An amount of 3 to 27% by weight of polymeric additive, based on the total weight of the blend, is used. Amounts less than 3% by weight do not produce an adequate opacifying effect. Increasing the amount of polymeric additive causes the tensile properties, such as tensile yield and break strength, modulus and elongation to break, to deteriorate and it has been found that amounts generally exceeding about 30% by weight can lead to film splitting during production. Satisfactory opacifying and tensile properties can be obtained with up to 20% by weight of polymeric additive. Amounts of polymeric additive in the range 8 to 11% by weight are useful and produce good opacity and useful tensile properties.

The polymeric additive used according to this invention is incompatible with the polyester component of the film and exists in the form of discrete globules dispersed throughout the oriented and heat set film. The opacity of the film is produced by voiding which occurs between the additive globules and the polyester when the film is stretched. It has been discovered that the polymeric additive must be blended with the linear polyester prior to extrusion through the film forming die by a process which results in a loosely blended mixture and does not develop an intimate bond between the polyester and the polymeric additive. Such a blending operation preserves the incompatibility of the components and leads to voiding when the film is stretched. A process of dry blending the polyester and polymeric additive has been found to be useful. For instance, blending may be accomplished by mixing finely divided, e.g. powdered or granular, polyester and polymeric additive and, thoroughly mixing them together, e.g. by tumbling them. The resulting mixture is then fed to the film forming extruder. Blended polyester and polymeric additive which has been extruded and, e.g. reduced to a granulated form, can be successfully re-extruded into an opaque voided film. It is thus possible to re-feed scrap film, e.g. as edge trimmings, through the process. Alternatively, blending may be effected by combining melt streams of polyester and the polymeric additive just prior to extrusion. If the polymeric additive is added to the polymerisation vessel in which the linear polyester is produced, it has been found that voiding and hence opacity is not developed during stretching. This is thought to be on account of some form of chemical or physical bonding which may arise between the additive and polyester during thermal processing.

The extrusion, quenching and stretching of the film may be effected by any process which is known in the art for producing oriented polyester film, e.g. by a flat film process or a bubble or tubular process. The flat film process is preferred for making film according to this invention and involves extruding the blend through a slit die and rapidly quenching the extruded web upon a chilled casting drum so that the polyester component of the film is quenched into the amorphous state. The quenched film is then biaxially oriented by stretching in mutually perpendicular directions at a temperature above the glass-rubber transition temperature of the polyester. Generally the film is stretched in one direction first and then in the second direction although stretching may be effected in both directions simultaneously if desired. In a typical process the film is stretched firstly in the direction of extrusion over a set of rotating rollers or between two pairs of nip rollers and is then stretched in the direction transverse thereto by means of a stenter apparatus. The film may be stretched in each direction to 2.5 to 4.5 times its original dimension in the direction of stretching.

After the film has been stretched it is heat set by heating to a temperature sufficient to crystallise the polyester whilst restraining the film against retraction in both directions of stretching. The voiding tends to collapse as the heat setting temperature is increased and the degree of collapse increases as the temperature increases. Hence the light transmission increases with an increase in heat setting temperatures. Whilst heat setting temperatures up to about 230°C can be used without destroying the voids, temperatures below 200°C generally result in a greater degree of voiding and higher opacity.

The opacity as determined by the total luminous transmission of a film depends upon the thickness of the film. Thus the stretched and heat set films made according to this invention have a total luminous transmission not exceeding 25%, preferably not exceeding 20%, for films having a thickness of at least 100 $\mu$, when measured by ASTM test method D-1003-61. Films of thickness 50 to 99 $\mu$ have a total luminous transmission generally up to 30%.

The invention also therefore relates to opaque biaxially oriented and heat set films produced from a blend of a linear polyester and from 3 to 27% by weight of a homopolymer or copolymer of ethylene or propylene and having a total luminous transmission of up to 30%. Such films may be made by the process specified above.

The globules of polymeric additive distributed throughout the film produced according to this invention are generally 5 to 10 $\mu$ in diameter and the voids surrounding the globules 3 to 4 times the actual diameter of the globules.

It has been found that the voiding tends to collapse when the void size is of the order of the film thickness. Such film therefore tends to exhibit poor opacity because of the smaller number of void surfaces at which light scattering can occur. Accordingly it is therefore preferred that the opaque films of this invention should have a thickness of at least 25 microns. Film thicknesses of between 100 and 250 microns are convenient for most end uses.

Because of the voiding, the films are less dense, i.e. lighter in weight, and more resilient than non-voided films. The density of the films of this invention is in the range 0.7 to 1.20.

The films may contain any compatible additive, such as pigments. Thus a light reflecting pigment, such as titanium dioxide, may be incorporated to improve the appearance and whiteness of the films. Other additives and fillers may be used to provide special effects such as slip and pencil take properties.

The films of this invention may be used without further treatment or they may be further treated, for example by the application of a coating. This coating may be heat sealable and can be applied by means of extrusion (in which case the film is preferably first treated with a priming material), or the heat seal polymer may be applied from aqueous dispersion. A further method of producing a coated film is to apply the coating to the film at some stage before orientation, or preferably, in the case of biaxially oriented film, between the two stages of biaxial orientation of the film. Suitable coatings which may be applied in this way include coatings of vinylidene chloride copolymers for example vinylidene chloride/acrylonitrile copolymers containing from 4 to 20% of acrylonitrile.

The films may be used in any of the applications for which polyethylene terephthalate is used, except of course those where a high degree of transparency is required. For example the film may be used as a paper substitute; as a base for carbon paper and carbon ribbon for use in typewriters; in applications where very high speed printing of tape is required, e.g. in high speed printing machines which are used in conjunction with computers; textile threads where the decorative appearance of the films is useful; magnetic recording tape; cable wrapping and as a thermal barrier in protective clothing.

The films of this invention exhibit a remarkable paper-like texture and are therefore suitable for use as a paper substitute, in particular as a base for photographic prints, i.e. as a substitute for photographic printing paper.

The invention therefore also relates to a photographic print base or printing material comprising a support in the form of an opaque biaxially oriented and heat set film formed from a blend of a linear polyester and from 3 to 27% by weight of a homopolymer or copolymer of ethylene or propylene having a total luminous transmission not exceeding 20%, said support carrying a photosensitive layer. The support preferably has a thickness of at least 100 $\mu$, and is preferably made from blends containing up to 20% by weight of the polymeric additive.

Conveniently the photosensitive layer is a silver halide-containing gelatinous layer. The photosensitive layer may be applied directly to the surface of the opaque support but preferably one or more intermediate layers are provided to enhance the adhesion of the photosensitive layer to the film surface. The intermediate layer(s) may be applied by any suitable method known for the application of coatings to polyester film surfaces. Generally, a polymeric subbing layer, such as vinylidene chloride copolymer which may be applied to the film surface from an aqueous dispersion during the film production (e.g. between the two stretching operations) or after the film has been made, may be applied directly to the surface of the film and a gelatinous subbing layer applied over the polymeric layer.

The photosensitive layer may be applied by any process commonly known in the photographic art for applying such layers.

Depending upon the conditions employed for producing the opaque film, the surface of the film may have a mat textured appearance. Such a surface is not very suitable for some photographic print uses and a glossy surface is preferred. Therefore the surface of the opaque support film may be modified by applying a layer of non-voided polyester or a polymer or copolymer of an α-olefine, polyethylene being particularly suitable. Such an assembly may be made by melt extruding a polyethylene layer on to the surface of the polyester support. Where the non-voided layer is of a polyester, it may be applied by coextruding laminae of the polyester + ethylene or propylene polymer and the unmodified polyester.

A support provided with a polymeric coating such as polyethylene may be coated with one or more intermediate layers as described above which may conveniently include a polymeric subbing layer and a gelatinous subbing layer. The surface of a coating such as polyethylene may need pretreatment, e.g. by corona discharge, to develop adhesion to further coatings which may be applied to it.

A variety of sandwich structures of voided and non-voided films may be made, comprising a layer of the opaque voided film laminated with one or more layers of polymeric non-voided films. An example of such a structure is a sandwich of a voided core layer with non-voided, but preferably opaque, polymeric layer on either side of the core. Such a sandwich would have greater stiffness relative to its weight (because of the lower density of the voided core) but would have both surfaces glossy. This type of sandwich could be used for applications such as identity documents and photographic prints.

Another example is a sandwich of one non-voided layer laminated to a voided layer. This sandwich could be used for laminating to boards and other substrates to give a glossy surface. The voided backing layer which is bonded to the substrate masks any grain or roughness of the substrate. Without such a backing layer any grain or roughness of the substrate shows on the glossy surface.

Yet another sandwich is a voided layer on either side of a non-voided core. Such a sandwich has greater resilience and formability, less sharp edges and improved tear resistance than a non-voided polyester film of the same thickness. This type of sandwich is of use as a synthetic paper and may be used in place of polyester film/paper laminate or polyester film/unwoven synthetic fibre fibric laminates in electrical applications.

The present invention is illustrated in further detail by the following examples.

EXAMPLE 1

Polyethylene terephthalate granules were tumble blended with 5% by weight of granular propylene homopolymer having a melt flow index of 4.0 when measured by ASTM test method D-1238-65T using a 2.16 kg weight at 230°C. The blend was extruded in the form of a film and rapidly quenched to render the polyester component amorphous. The film was then stretched in the machine direction 2.8 times its initial dimension at 98°C and then stretched transversely 3.0 times its initial dimension at 105°C. The film was heat set under constant dimensions at 190°C to give a finished film of 155 microns thickness. The film produced had a white opaque appearance resulting from voiding around the polypropylene globules and its total luminous transmission was 21%. The film also exhibited the following properties.

|  |  | Machine direction | Transverse direction |
|---|---|---|---|
| Yield strength | $10^3 \times$ psi | 9.7 | 10.7 |
| $F_s$ | $10^3 \times$ psi | 9.4 | 10.3 |
| Break strength | $10^3 \times$ psi | 17.9 | 17.2 |
| Modulus kg mm$^{-2}$ |  | 324 | 389 |
| Elongation at break % |  | 209 | 130 |

The film was coated with conventional vinylidene chloride copolymer and gelatinous subbing layers and then overcoated with a gelatinous light sensitive silver bromide emulsion. The coated film rendered excellent photographic prints when exposed to a light image and processed in a conventional manner.

EXAMPLES 2 TO 5

The procedure of Example 1 was repeated for Examples 2 to 5. The polymeric additive was granular polypropylene homopolymer having a melt flow index of 4.0 when measured by ASTM test method D-1238-65T using a 2.16 kg weight at 230°C and the polyester was polyethylene terephthalate. The proportion of polypropylene added and the stretching and heat setting conditions are shown in the following table together with the properties of the resulting film which was voided and opaque.

|  |  | Examples | | | |
|---|---|---|---|---|---|
|  |  | 2 | 3 | 4 | 5 |
| Percentage by weight of polypropylene | | 5 | 10 | 10 | 10 |
| Machine direction draw ratio at 98°C | | 2.8:1 | 3.0:1 | 2.8:1 | 2.8:1 |
| Transverse direction draw ratio at 105°C | | 3.0:1 | 3.2:1 | 3.0:1 | 3.0:1 |
| Heat set temperature °C | | 190 | 200 | 190 | 190 |
| Final film thickness microns | | 170 | 140 | 160 | 190 |
| Total luminous transmission % | | 16 | 8 | 13 | 8 |
| Yield strength $10^3 \times$ psi | machine direction | 12.3 | 8.1 | 8.5 | 7.9 |
| | transverse direction | 12.8 | 8.2 | 9.2 | 8.9 |
| Break strength $10^3 \times$ psi | machine direction | 23.5 | 14.1 | 13.4 | 13.3 |
| | transverse direction | 22.8 | 14.1 | 14.0 | 12.7 |
| Modulus kg mm$^{-2}$ | machine direction | 389 | — | 283 | 256 |
| | transverse direction | 453 | — | 339 | 312 |
| Elongation at break % | machine direction | | | | |
| | transverse direction | | | | |
| $F_s$ $10^3 \times$ psi | machine direction | 11.3 | 8.1 | 7.9 | 7.7 |
| | transverse direction | 12.1 | 8.4 | 8.9 | 8.5 |

The films so obtained were coated firstly with a conventional vinylidene chloride subbing layer and then with a conventional gelatinous subbing layer using standard coating techniques. An overcoating of a gelatinous light sensitive silver bromide layer was then applied. When the coated films were exposed to a light image and developed and fixed in conventional processing solutions good quality photographic prints were obtained.

In modifications to the above Examples 1 to 5 the opaque films obtained therein were coated with a subbing layer comprising a mixture of a butadiene copolymer and gelatin. The butadiene copolymer had the composition: 36.8 mole % butadiene, 60.5 mole % styrene and 2.7 mole % itaconic acid.

The subbing composition made up from the butadiene copolymer was (parts being measured by weight):

| | |
|---|---|
| 10 parts | butadiene/styrene/itaconic acid copolymer |
| 1 part | gelatin |
| 1 part | active ionic emulsifier available commercially under the trade name "Teepol" 610 |
| 88 parts | distilled water |

The films coated with the above composition were overcoated with a conventional gelatinous silver bromide emulsion. When exposed to a light image and processed in conventional photographic processing solutions good quality photographic prints were obtained.

EXAMPLES 6 to 14

The procedure of Example 1 was repeated using the same polypropylene polymeric additive blended in amounts of 15, 20 and 25% by weight with polyethylene terephthalate. The stretching conditions were as specified in Example 1. The amounts of polypropylene and heat setting temperatures are specified in the following table together with the resulting film properties.

| | Examples | | | | | | | | |
|---|---|---|---|---|---|---|---|---|---|
| | 6 | 7 | 8 | 9 | 10 | 11 | 12 | 13 | 14 |
| Percentage by weight of polypropylene | 15 | 15 | 15 | 15 | 15 | 15 | 15 | 20 | 25 |
| Heat set temperature °C | 213 | 205 | 199 | 200 | 205 | 216 | 217 | 190 | 190 |
| Final film thickness microns | 70 | 70 | 68 | 120 | 135 | 105 | 185 | 75 | 70 |
| Total luminous transmission % | 25 | 25 | 26 | 15 | 19 | 21 | 12 | 24 | 25 |
| Density | 0.93 | 1.02 | 0.94 | 0.93 | 0.92 | 1.02 | 0.83 | 0.85 | 0.82 |

The opaque films obtained in these examples were coated with a conventional gelatinous light sensitive silver bromide emulsion and yielded good quality photographic prints when exposed to a light image and processed in a conventional manner.

We claim:

1. A process for the production of an opaque molecularly oriented and heat set linear polyester film, which comprises forming a loosely blended mixture of particles of a linear polyester produced by condensing at least one dicarboxylic acid, a lower alkyl diester thereof or bis-p-carboxyphenoxyethane with at least one glycol with from 3 to 27% by weight of particles of a homopolymer of ethylene or propylene, there being no intimate bond between the polyester and homopolymer, extruding the blended mixture as a film, quenching and biaxially orienting the film by stretching it in mutually perpendicular directions, and heat setting the film.

2. A process according to claim 1, in which the linear polyester is polyethylene terephthalate.

3. A process according to claim 1, in which the blended mixture is formed with a homopolymer of propylene.

4. A process according to claim 1, in which the homopolymer is present in an amount of up to 20% by weight.

5. A process according to claim 1, in which the heat setting temperature is up to 200°C.

6. An opaque molecularly oriented and heat set linear polyester film produced from a blend of particles of a linear polyester produced by condensing at least one dicarboxylic acid, a lower alkyl diester thereof or bis-p-carboxyphenoxyethane with at least one glycol and from 3 to 27% by weight of particles of a homopolymer of ethylene or propylene and having a total luminous transmission of up to 30%, the homopolymer being dispersed in the form of discrete particles throughout the oriented and heat set film.

7. An opaque film according to claim 6, having a thickness of at least 100 μ and a total luminous transmission not exceeding 20%.

8. An opaque film according to claim 6, having a density in the range 0.7 to 1.20.

9. An opaque film according to claim 6, in which the linear polyester is polyethylene terephthalate.

10. An opaque film according to claim 6, in which the blend is formed with a homopolymer of propylene.

11. The process of claim 1 wherein the polyester and homopolymer are blended together by dry blending powdered or granulated polyester and the homopolymer to obtain said loosely blended mixture wherein there is no intimate bond between the polyester and homopolymer.

12. The process of claim 1 wherein the polyester and homopolymer are blended together by combining to melt streams of the polyester and homopolymer just before extrusion.

* * * * *